United States Patent [19]

Zandveld et al.

[11] Patent Number: 4,841,474
[45] Date of Patent: Jun. 20, 1989

[54] COMPUTER SYSTEM WITH WORK STATIONS AT REMOTE POSITIONS AND RESERVE BATTERY POWER SUPPLY

[75] Inventors: Frederik Zandveld; Peter C. L. Van Der Vliet, both of Apeldoorn, Netherlands

[73] Assignee: U.S. Philips Corporation, New York, N.Y.

[21] Appl. No.: 733,272

[22] Filed: May 10, 1985

[30] Foreign Application Priority Data

May 15, 1984 [NL] Netherlands ............... 8401557

[51] Int. Cl.$^4$ .............. G06F 15/00; G06F 11/30
[52] U.S. Cl. ........................ 364/900; 307/66; 371/66; 364/145; 364/943.91; 364/948.4; 364/948.5
[58] Field of Search .......... 365/228, 229; 371/7, 371/9, 10, 12, 66; 364/200, 900, 492, 493, 569, 144, 145, 187, 146; 307/64, 66

[56] References Cited

U.S. PATENT DOCUMENTS

| | | | |
|---|---|---|---|
| 4,165,532 | 8/1979 | Keydall et al. | 364/145 X |
| 4,213,182 | 7/1980 | Eichelberger et al. | 364/900 X |
| 4,293,915 | 10/1981 | Carpenter et al. | 364/145 X |
| 4,412,284 | 10/1983 | Kerforne et al. | 364/200 |
| 4,458,307 | 7/1984 | McAulis et al. | 364/200 |
| 4,471,424 | 9/1984 | Persson | 364/145 |
| 4,489,385 | 12/1984 | Miller et al. | 364/900 X |
| 4,525,788 | 6/1985 | Gottlieb et al. | 364/146 X |
| 4,584,651 | 4/1986 | Carey, Jr. et al. | 364/569 X |
| 4,641,269 | 3/1987 | Japenga et al. | 364/146 |
| 4,677,310 | 6/1987 | Midorikawa et al. | 364/145 X |
| 4,698,748 | 10/1987 | Juzswik et al. | 364/200 X |

Primary Examiner—Gareth D. Shaw
Assistant Examiner—Paul Kulik
Attorney, Agent, or Firm—Thomas A. Briody; Jack E. Haken; Jack D. Slobod

[57] ABSTRACT

A computer system having a central machine, work stations and a background memory, wherein the central machine has an active state, a standby state, a battery power supply state and a rest state, a heart memory maintains the actual time and contains information indicating at what time of what days the active state should prevail. When the mains power supply fails the central machine goes over to the battery power supply state. When the latter is failing, the battery indicator is set in an "error" state. When the mains power supply reappears, it is inspected whether then the active state has to be maintained and under the control of an "error" position an initial program load operation is carried out. If admissible the central machine goes over to the standby state.

11 Claims, 4 Drawing Sheets

FIG.4

| MNS | ONOFF | 65 | 61 | 88 | 86 |
|-----|-------|----|----|----|----|
| NOK | FF | FF | FF | FF | FF |
| NOK | ON | FF | ON | ON | FF |
| OK | FF | FF | FF | FF | FF |
| OK | ON | ON | ON | ON | ON |

COMPUTER SYSTEM WITH WORK STATIONS AT REMOTE POSITIONS AND RESERVE BATTERY POWER SUPPLY

BACKGROUND OF THE INVENTION

1. Field of the Invention

The invention relates to a computer system comprising a central machine with connections for mains feed and a reserve battery feed for a volatile memory, at least one work station having operator actuation means, a non-volatile background memory and interconnecting means between the central machine, any work station and a background memory. The central machine has at least one active state, a standby state, a battery feed state and a rest state and is actuated by a call command from a working station from the standby state to the active state. In the active state data processing can be carried out and in the standby state the volatile memory is powered by the mains feed for retaining information. In the battery feed state, when the mains feed is absent, the volatile memory is powered by the reserve battery for a limited interval for retaining information. In the rest state the central processor and the volatile memory are deactivated.

2. Description of the Prior Art

Computers having local or remote work stations may be used, for example, in banking systems. The work stations may be "intelligent" or not. A computer having different operating states with different activation levels is known from U.S. Pat. No. 4,317,181. This relates in particular to a pocket calculator in which the display and the data processing may be selectively actuated, as the case may be. In inactive situations current is saved. As a matter of course, the pocket calculator also has an "off" position. Such a pocket calculator is organized only locally.

SUMMARY OF THE INVENTION

In the computer system of the kind set forth in the preamble which may be much more extended, the standby state is activated, for example, when in view of the scheduled working hours no further requests for processing are expected. In this standby state inter alia, current is saved. In the standby state wear is usually reduced, which wear may be mechanical or electronic and by switching off some parts the general safety of operation is enhanced. When the mains voltage is lacking, the active state of the system can pass automatically to the battery feed state. Then the processing operations are stopped and the volatile memory remains at the feeding voltage so that the information therein remains unchanged. It is an object of the invention, when the mains feed falls out and reappears again to create under all conditions the correct, independent attainment of the active state or the standby state in dependence of the state described by any instant according to time schedule. For example, for each working day a given active period may be described. For given days a week (weeks) and also for one or more other predetermined periods, for example, holidays, this may be different. This is achieved in that the central machine comprises a "heart" memory for non-volatile storing the beginning and end instants for the active state. Said heart memory has means for updating an actual time in all states of the computer system. A battery indicator (BAWOFF) is provided with a "normal" state and an "error" state in order to indicate failure of an activated battery state. A first inspection control is provided to inspect the state of the battery indicator, when the mains feed reappears and to control an initial program loading operation (IPL) under the control of the "error" position during prescribed active state at a beginning/end instant, but otherwise the standby state. The actual time can be compared with the prescribed operational time and only during the operational time the active state is normally activated. However, if in the standby state outside the operational time failure of the mains feed has occurred, the reappearance of the mains feed requires also some work so that at least for this purpose the active state is actuated at least for the time required thereto. This also occurs when the mains feed is lacking within the operational time and goes on beyond the end of the operational time so that no operator is available for manual re-initiating the correct operation. The initial program loading operation (IPL) will be further described hereinafter.

It is advantageous when there is an activating indicator (RUN) having an "activated" position and a "non-activated" position in order to signal, in the "activated" position, a most recent, temporarily operative activation request independently of the mains feed situation, while a second inspection control is provided for inspecting the state of the activating indicator at the reappearance of the mains feed and at a detection signal of the first inspection control representing a "normal" state and to initiate, in the "activated" position, the initial program load, while said standby state is controlled in case of the "non-activated" position. A temporary activating request can usually not be dealt with when the battery feed state is present. When the mains feed reappears sufficiently early that the error state has not yet occurred, the activating request can yet be satisfied.

It is advantageous when under the control of the said "normal" state that a third inspection control is activated for a "restart" indicator in order to activate the second inspection control when it is "untrue", but in the "true" position the restart operation takes place. A restart indicator in the volatile memory can indicate whether a restart operation is useful without a need for directly carrying out a new IPL operation.

It is advantageous when under the control of the "true" state of the "restart" that, the restart operation is exclusively carried out under the control of a further activation signalling and is in the awaiting position in the absence thereof. Also the further activation signalling can indicate whether a restart operation may be useful or not; it may be concerned with the beginning-/end instants of the active position; beyond the same the restart operation is usually superfluous. The further activation signalling can also indicate the time after the most recent activation request. When this time exceeds a given value, restarting may probably be useless. Also other activation signallings, for example, combinations of the two signallings mentioned may sometimes be advantageous.

It is advantageous when under the control of said "non-activated" state that a fourth inspection control is activated for a "sleep" indicator in order to initiate the initial program in the case of "untrue" thereof. Also this sleep indicator may be advantageously stored in the volatile memory and be inspected by the program.

BRIEF DESCRIPTION OF THE FIGURES

The invention will be set out with reference to the Figures.

DESCRIPTION OF THE COMPUTER SYSTEM

Figure 1:
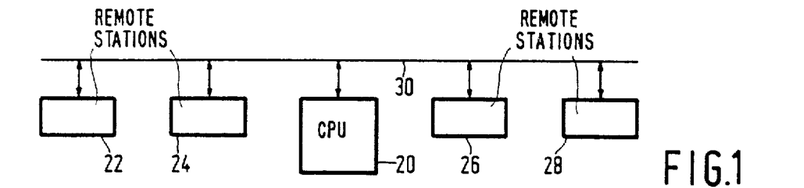
FIG. 1 is a computer system to be used with the invention.

FIG. 1 shows a computer system for use with the invention. The block diagram shows first a central machine 20. This machine comprises the processing means proper, the local memory, both the volatile memory and the non-volatile (magnetic disc memory), a control panel for the operator (see FIG. 7) and control-units for peripheral apparatus and data communication. Each control-unit occupies, for example, its own printed wiring card. The memories constitute working memories and background memories, for example, for data files. There are furthermore remote work stations 22, 24, 26, 28. The distances from the central machine may be (tens of) meters or also thousands of kilometers. Moreover, the number of work stations may be small or very large. In principle, work stations may be constructed in the same manner as the central machine and, at any rate, they are provided with an alpha-numerical keyboard with additional control-keys and a display screen. On the other hand in a work station the data storing or processing capacities will be usually (much) lower than in the central machine and for calling certain files the central machine has to be accessed. For this purpose the work stations can have a special control-key (RRUN) for steering the central machine into the active state, if it was not yet therein, which has practically the same effect for the central machine as in the case in which it is locally steered into the active state. The central machine and the work stations are interconnected by a communication network 30, which may be constructed as a star, a bus or another configuration. It may furthermore be formed by a plurality of partial networks. Moreover, more central machines may be provided. In this embodiment the central machine comprises only a small number of control-means (see FIG. 7) and, in particular, it does not comprise its own alpha-numerical keyboard, but this is not a limitation.

Description of several time diagrams and a state diagram

Figure 2:
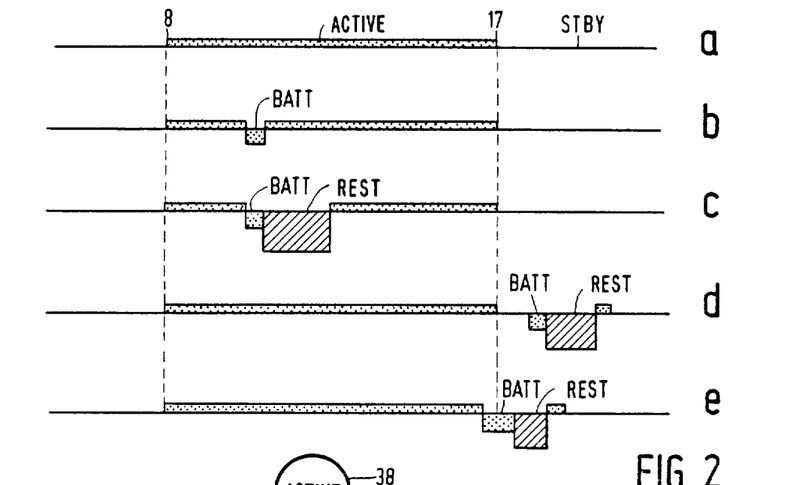
FIG. 2 is a time diagram in which the various machine states can occur.

FIG. 2 shows several time diagrams for various states (active state, standby state, battery feed state and rest state). FIG. 2a shows the operational sequence in the normal office or industrial situation. On the abscissa is plotted the time; at "8" hours in the morning the central processor is driven to the active state at the beginning of the normal business hours. There are various possibilities:

a. The central processor has a time-of-day clock by which the officially accepted time is updated. It is compared with previously introduced information indicating when the business hours have to start. Upon passage the active position is initiated. In the embodiment there is a further indicator indicating whether the day in question is a working day or a non-working day. b. An operator actuates an activating "RUN" key (see FIG. 7 element 106). c. An operator supplies from a remote work station an activating signal (remote RUN).

It is supposed that before the instant concerned the standby state prevailed uninterruptedly since the end of the preceding active state.

Without disturbances the active state can go on. However, in the situation described it is terminated at the end of the business hours at "17" hours in the evening and the central machine goes over to the standby state. One possibility is that when the instant of "17" hours has passed and for a given period of a few minutes no data processing activity is present, the standby state can be independently attained: this can be obtained by the programming. A further possibility consists in that an operator indicates locally or through a work station that the machine has to go over from the active state to the standby state. Upon such operator indication a switching-off program is called, which first checks whether a change-over to the standby state is admissible. When users' programs have still to be executed, this is done first and subsequently the change-over is carried out (it is noted that the necessary means present in the work stations are not shown for the sake of brevity). When at the instant "17" the active state is not present, the machine is further controlled in the manner described in FIG. 2e for the battery feed state or the state in which the battery feed had lacked. When at the instant "17" the machine was in the rest state because the switch was locally set at the "out" state (FIG. 7), nothing will occur.

From the standby state the active state can be initiated outside the normal operation hours by an operator, for example, for consulting a data file controlled by the central machine. This can be done by actuating a switching element on the control-panel of the central machine or a key on the keyboard of a work station. When the latter occurs outside the normal working time, the central machine detects this by comparing the actual time with the prescribed operation hours. Then an interval, or a "time-out" mechanism is activated until a change-over to a standby state, for example, when for five minutes no further interaction with a work station has taken place or when no key is actuated. The change-over can also occur after a formal terminating command of the interaction. There may also be provided other possibilities.

FIG. 2b illustrates a situation in which during the active state the mains feed fails and the battery feed state is switched on. (BATT). In this case no memory information gets lost. It is, however, possible that an I/O operation should not occur correctly. For example, an interaction with a magnetic disc memory may take some $10^{-2}$ sec, which is longer than the time passing between the detection of the failing mains voltage and the instant at which the mains voltage has fallen to an extent such that no normal processing operation can any longer take place. The falling-off time of the mains feed is determined by the stabilized direct-current feed fed by the public mains. In particular the falling-off time is determined by the stabilized feed comprising a choke and/or a capacitor. When the mains feed becomes again operative a short time afterwards, the system has to go back to a restarting point in the processing so that inter alia the interrupted I/O operation can be carried out as a whole. This restartable point is indicated by the state of the program executed up to then. The restart itself is determined by the program and the details lie outside the scope of this invention. For the sake of brevity this will not be further described.

FIG. 2c shows the same situation as FIG. 2b, but the interruption of the mains feed takes for such a time that the battery becomes empty. As a matter of course, the capacity of the battery is chosen so that this is sufficiently improbable but the situation should not be neglected. When the mains feed becomes again operative, the contents of the volatile memory have been lost. Then a reactivating operation has to be carried out. This will be specified further hereinafter. At any rate the working data including program data have to be fetched from the background memory, in a so-called initial program loading operation (IPL). It will furthermore be necessary to further store the conditions of failing in a non-volatile part of the memory.

FIG. 2d shows the same situation as FIG. 2c, but failing of the mains voltage occurs when the computer is in the standby state .(In the case in which the active state is activated only temporarily, for example outside the office hours, the same situation as shown in FIG. 2c occurs). The situation of FIG. 2d results in that after the reappearance of the mains feed the active state is initiated automatically for a short time. In this active state it is verified inter alia whether at the failure of the mains voltage the standby state had, indeed, already occurred; in this case the standby state can be reassumed without particular registration. Furthermore, if necessary, registration of the conditions may occur.

FIG. 2e shows a situation lying between the situations of FIG. 2c and 2d. Failure of the mains voltage occurred in the working hours, but the reappearance occurred after the end of the prescribed working hours. In this case at the reappearance any program carried out earlier has to be finished and data from the volatile part of the memory have to be restored when they were not copied in the background memory (non-volatile memory). This is then registered. When the program concerned is finished the system goes over to the standby state because the working hours have elapsed. When, on the contrary, at the reappearance of the mains voltage the working hours have begun again, the same operations are carried out as in the situation of FIG. 2c.

The situation of FIG. 2b, the temporary failure of mains feed with sufficient battery feed, may also occur in other situations. When both beginning and end occur in the standby state, no particular operations need be restarted at the reappearance of the mains feed. This situation is signalled during a short active time. When the beginning occurs during the standby state and the end occurs during the working hours, after the reappearance of the mains feed the active state is assumed and maintained without the need for restarting a particular operation. When the beginning occurs during the active state and the end occurs during the normally standby state, restarting of some particular operation can be activated either at the reappearance of the mains voltage or at the beginning of the next-following normal working hours.

Figure 3:
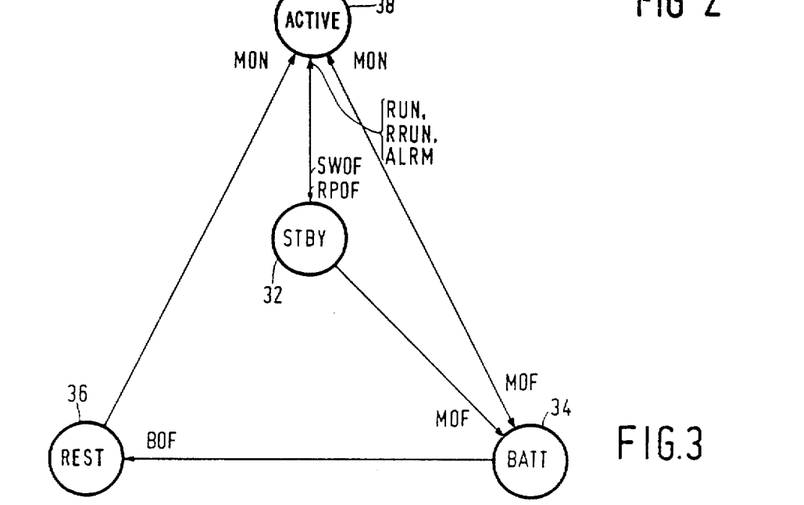
FIG. 3 shows a relational diagram of the machine states.

FIG. 3 is a relational diagram of the states of the central machine. Macroscopically it shows only four states:

a. the active state (38). In this state all subsystems are active or they may be directly activable. This applies in particular to the processing elements, the mains feed, the volatile memory capacity and the data communication facilities. This is the sole state in which the central machine can carry out data processing and exchange information with peripheral apparatus.

b. the standby state (32). In this state the main memory and the control-panel are powered and the data communication can recognize a remotely initiated activating command. This situation can start by a switching-off command formed by the central processor itself (SWOF) or by a remotely generated switching-off command (RPOF). This state can be left by an activating command from the local control-panel (RUN), by an activating command initiated remotely (RRUN) or by an alarm signal produced by the "absolute" time clock when the beginning of the working hours is passed (ALARM); then a relevant operation is initiated under program control. This state can also be left by a signal indicating the failure of the mains feed (MOF). Then the system goes over to the battery feed state.

c. the battery feed state (34). Apart from the identity of the feeding source the feed configuration is the same as in the standby state.

This state can be activated when in the standby state the mains feed is lacking (MOF) or when in the active state the mains feed is lacking (MOF).

This state can be left when the mains feed reappears or is activated (MON); then the programmating control decides whether the system will go or not go over to the standby state. This state can also be left when the battery feed becomes insufficient or is absent: then the system goes over to the rest state. From there the system cannot go over to the standby state.

d. the rest state (36). Here no feed is present or it is not used. This state can also be obtained when in any other state the on/off switch of the system is set in the "off"-position (the latter has not been indicated).

This state can be left when the mains feed switch is put to "ON" and when this mains feed is in fact available or when the switch is in the "ON" position and the mains feed appears: in these cases the active state results.

Figure 7:
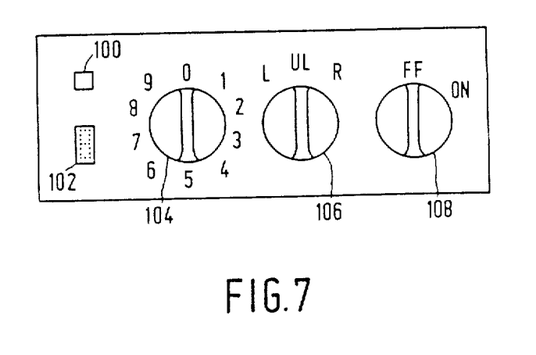
FIG. 7 shows a control panel.

The phenomena generated by the apparatus which are detected are thus the following: MOF, BOF, MON, (R)RUN, SWOF, RPOF. In the active state decisions have to be taken regarding the operations to be carried out and any change-over to be effected to another state. In the first place two hardware indicators are present:

a. BAWOFF, which indicates the value zero when during the most recent situation of insufficient mains voltage the battery feed has been sufficient. If at any time the battery feed becomes insufficient, this indicator is set to "1". Resetting to "0" appears by the event MOF. If at the reappearance of the mains voltage this indicator has the value "1", the volatile memory has to be fully loaded again.

b. RUN; this has the value "1" under the contr of the occurrence of one of the events RUN, RRUN or ALARM. The central machine comprises a memory circuit which, upon the change-over from the standby state to the active state stores the signalization (R)RUN until the operations then to be carried out are executed. Then the programing sets this memory circuit back to "0". If this memory circuit comprises the signalization "1", the beginning of the normal working hours will be passed by without the operations normally associated with this beginning being carried out. Also during the active position the phenomenon (R)RUN may occur in that the key concerned on the central machine or the work station is actuated. This initiates an interruption followed by an operation determined by the position of the IPL selector (FIG. 7 element 104). This will be specified hereinafter.

Next, the relevant programmatic situations will be described as sub-states of the active state (38).

a. DECISION is an assembly of mutually exclusive sub-states. Each of these is activated by the associated change-over after the standby state, after the battery feed state and after the rest state.

b. HOLD is a loop state which is activated for a (short) time before the associated "DECISION" state is activated. It is provided in order to connect and activate test apparatus without the latter being reset by switching-on of the mains feed and without part of the program being carried out before the test can start. Thus given addresses can be examined. For this purpose a signal "INPUT CODE"=0 is provided. This state is left only when the activation (RUN) switch is actuated and the INPUT CODE is not equal to 0.

c. IPL: in this state a simple functional test of central processor and main memory is carried out. For the sake of brevity this test is not further described. In this test information in register(s) and/or memory may be changed or may not be varied. This is controlled by the contents of the heart memory to be described hereinafter. The latter can be programmed in order to selectively effect a so-called "warm" or a so-called "cold" activation (in a warm start given information in the volatile memory is still considered to be reliable, whereas it is not reliable in a cold start) in order to carry out the (self) testing destructively or non-destructively with respect to the (still present) information in dependence on the seriousness of the error and/or the critical or non-critical character of the information. This can be specified by a user. In some cases, in FIG. 2b, the operations may be continued while restarting any interrupted I/O operations. In other more critical cases a number of information items will be copied from the non-volatile memory. Moreover the actual time is a deciding factor. Outside the normal working hours testing can usually be omitted. However at a return from the rest state a self-testing is always carried out. The initial program loading can be carried out from a physical location indicated by an IPL selector (FIG. 7, 104). For this purpose first a command is given to the peripheral apparatus, where this location is situated and the reaction of this peripheral apparatus is checked. Finally the program just loaded is started.

d. RESTART: this state can be initiated when due to failing of the mains feed (MOF) an input/output operation has failed and measures are taken to repair the same. In this state the information in the volatile memory are undisturbed, while the register contents of the central processor have been saved in the memory. Then the registers of the central processor are filled with the correct information and the processing operations are taken up again and, as far as possible the state of the input/output apparatus at the beginning of the missed operation is restored.

e. AVAILABLE: the central machine can be loaded with the programming information. (for example, from a background memory). The relationship between these five states will be described more fully with reference to a flow diagram.

Then some change-overs will be described as far as they influence the program.

MOF operates as an interrupting signal and then there is a limited interval (for example, 0.05 sec) to realize a short interruption of the processing, while finally the state "BATT" results. The limited interval is determined by the output characteristic of the stabilized power supply which is directly powered by the mains.

(R)RUN also operates as an interruption signal which has to be processed by the program when an operation demanded by a local or a remote work station must be activated.

In the situation HOLD with the IPL selector differing from zero, the state HOLD is left, however.

In the situation AVAILABLE or RESTART in the case of the IPL selector being at zero the signal RUN leads to a compelled storing of the actual information into the background memory. When the IPL selector is not at zero, an initial program load is carried from the peripheral apparatus indicated by the selector.

There are the following programmatic indicators: SESSION INDICATION: this indicates whether at the last change of state the state ACTIVE was present. If so, when this indicator is consulted at the (re)appearance of the mains voltage, the system goes over to the active state (ACTIVE). In the other state the system goes over to the standby state in order to wait for one of the situations ALARM, RUN or RRUN.

The indicator START MODE is used when it has been decided that the system has to go to the active state, while the memory contents are undisturbed. This indicates the selection between the temporary transitional states IPL and PROCEED/RESTART. The difference between the latter two is here not significant.

The IPL selector to be discussed in dealing with the control panel of the central machine has a number of positions having the following effects in the embodiment described (positions being numbers):

0: at the appearance of the event MON the situation HOLD results this transition also occurs when the heart memory has not yet been initiated. When on the contrary the mains voltage is lacking, a known DUMP operation is carried out in which the dumped operation is stored to a peripheral apparatus of which the address is present in the heart memory.

1: IPL operation in which the information is supplied by a local background memory (magnetic disc or tape) or by a remote storage device. The address is again in the heart memory. This is the "normal" position of the selector.

2: As in 1, the address being (somewhere else) is in the heart memory. This is a reserve position.

3: IPL operation, exclusively from a local background memory, the address of which is stored in the heart memory.

4: IPL operation exclusively from a remote background memory, the address of which is stored in the heart memory.

Other possibilities may be:

The IPL operation is carried out from the (volatile) memory for a rest operation.

CONTINUE, a progressing position in which a programmatically controlled activating operation is carried out after a DUMP as according to the 0 position.

The addresses in the heart memory for each position of the IPL selector are predetermined.

Furthermore, at the reappearance of the mains voltage in the normal operational hours it will be decided to go over either to an overall (cold) IPL operation, or to a partial (warm) IPL operation in which a given amount of information remains considered as reliable, or even to a "restart" operation under program control. Among these steps the first takes comparatively much time, the second takes less time and the third much less time. Outside the normal operational hours they need not to be carried out. The decision concerned is taken on the basis of a few apparatus indicators (RUN/BAWOFF), a few program indicators as discussed and the actual time of the day.

The self test as discussed above does not cause loss of information. In dependence on the result of the self test it is decided whether an IPL operation will be carried out or whether an error indication will be given because the apparatus operates erroneously. This self test can be executed by the program in a more or less extended manner, as represented by a greater or smaller number of test patterns.

A further test can relate to the internal consistence of a number of quantities of information stored in the volatile memory, for example, with an error detection on the basis of a cyclic redundancy (CRC), that is to say, on bit level. It is furthermore possible to check the data on a higher level, for example by checking the completeness of a set, e.g. whether a segment table is completely filled.

Now a complete content of a heart memory is described which 64 information bytes, of which the first 14 are preset by the manufacturer:

HEX 0E-10. End of the normal operational hours (hours, minutes, seconds);
HEX-11-13 Beginning of holiday period: day, month, year;
HEX 14-16 Ditto at the end;
HEX 17 Seven bits indicating for every workday whether said day has any operational hours plus 1 bit indicating "all days";
HEX 18 Start Mode indication;
HEX 19-1B Soft HWDI;
HEX 1C-1E Indication for a first IPL under program control;
HEX 1F-21 Ditto second;
HEX 22-2F not used;
HEX 30-33 Hours counter;
HEX 34-37 Sequence indication;
HEX 38-3B Indication of the computer system in question;
HEX 3C-3D Validity checking pattern;
HEX 3E-3F Initialization pattern.

FURTHER DESCRIPTION OF THE APPARATUS

Figure 4:
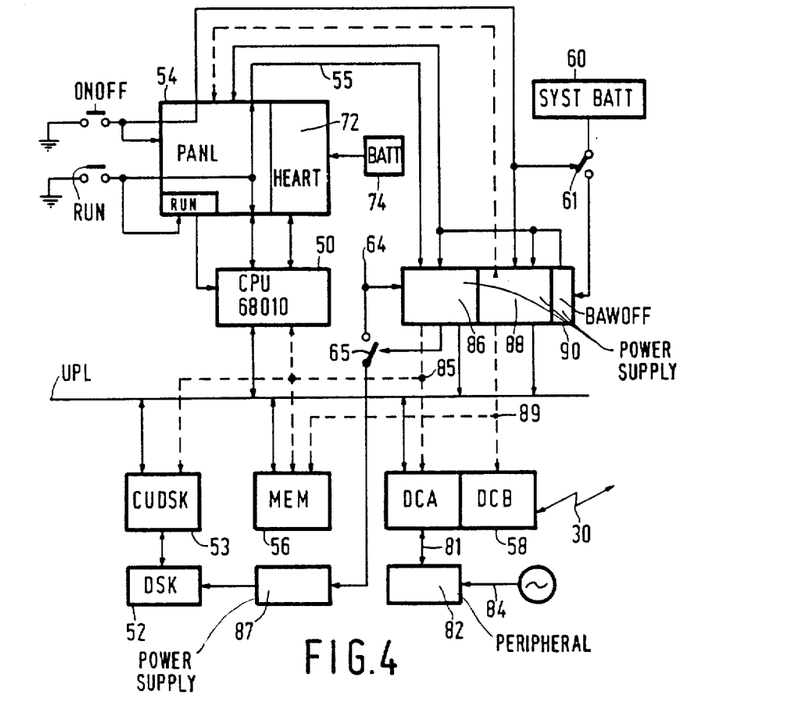
FIG. 4 is a block diagram of the central machine and its surroundings.

FIG. 4 is a block diagram of the central machine in its direct environment including the general bus UPL and some peripheral apparatus. The processor 50 itself is built up around a circuit of the type 68010, made by Signetics Corporation, Sunnyvale, Calif., U.S.A. The further elements of this processor are also conventional parts, for example, a memory control unit (MMU), a program memory, interface elements to the further block elements. There is furthermore a so-called main memory 56 formed by dynamic RAM modules of adequate capacity. The refresh organization is not further described for the sake of brevity. There is furthermore a control-panel 54 with switches to be actuated by an operator (see FIG. 7). There is a peripheral apparatus 52 in this case formed by a magnetic disc memory including a control-unit 53. This peripheral apparatus serves for general use in the whole system. There is furthermore a second peripheral apparatus 82, which may be remote apparatus, for example, a work station or a printer. It has local mains feed as schematically indicated by an indication 84. Other peripheral apparatus will be known to those skilled in the art. There is furthermore an interface unit 58 for exchanging data and control-signals with element 82 through a line 81 and through the above-mentioned communication network 30 with this and other peripheral apparatus (not shown) or with other central machines. The unit 58 consists of two parts DCA and DCB. The part DCB is at least capable to recognize an activating command (RRUN) arriving via the communication network 30. The part DCA is capable to execute such tasks in the scope of the necessary interfacing to the communication network which the data DCA does not execute. Together the parts DCA and DCB carry out all interfacing tasks; in itself the set of such tasks may be conventional. The power supply for the elements takes place as follows. The supply of the peripheral apparatus 82 has been discussed. There is a mains feed connection 64. Furthermore a stabilized power supply device 87 is provided for the background memory 52. This supply is switched by means of switch 65, which is actuated by a control-signal from block 86. The latter block together with the parts 88, 90 constitutes a central stabilized power supply apparatus. The supply connections are indicated by broken lines. The parts 86, 87, 88 in this embodiment have all to be operational for the system to be able of normally processing data. The part 86 powers the processor 50, the control-element 59, the memory 56 and the data communication unit (DCA). The part 86 can only be operative when there is sufficient mains feed and when part 88 is normally operating. Part 88 can be operational when there is either sufficient mains feed or a sufficient battery feed from battery 60. This part 88 has to be operational in order to maintain the standby position. In this case by the separately indicated line 89 the memory 56, the data communication unit DCB and the panel 54 are powered. It is possible that the feed lines 85, 89 from the parts 86 and 88 would coincide and that an internal change-over takes place. Alternatively the lines 85, 89 may be separate as indicated. The part 90 is the above-mentioned indicator BAWOFF. The control-panel comprises furthermore the indicator RUN.

The information traffic through the bus UPL can be in a conventional manner and is not further discussed. The information from indicator BAWOFF is available in panel 54 and in the parts 66, 88 of the power supply apparatus as is indicated. The information from the indicator RUN is available in the processor 50. The panel 54 has an ONOFF switch. When it is set in the position ON the panel 54 and the part 88 of the power supply apparatus is energized as well as switch 61 so that, if necessary, the battery can be recharged and, at any rate, would continue to supply provisionally the first-mentioned parts when the mains voltage would fail.

Figure 4A:
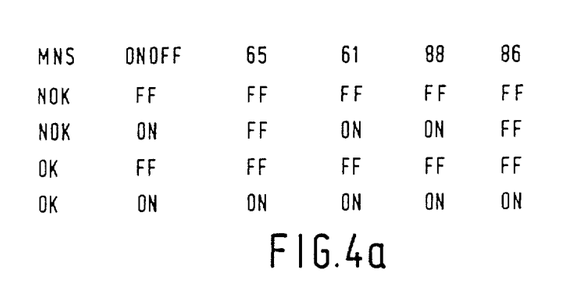
FIG. 4a is a table of binary quantities thereto.

When the standby position is present and the switch RUN is activated, the indicator RUN is set on and, moreover, via the line 55 the part 86 of the power supply apparatus is activated so that the active state can be reached. In this connection FIG. 4a shows a number of states of the various parts. The first column indicates the state of the mains: OK and NOK respectively. The second column indicates the position of the switch ONOFF i.e. conducting (ON) or interrupted (FF). The third column indicates the position of switch 65 with the same indication as column 2. The fourth column indicates the position of the switch 61 with the same indications. The fifth column indicates the activity ("out") FF and "ON") of the part 88. The sixth column indicates the same for part 86. It furthermore applies in particular that for the first and the third rows the indicator BAWOFF has the value "1". On row 2 the same applies provided that the battery had become empty. Row 4 only applies when the system is not in the standby state.

The panel furthermore includes a heart memory 72. This is always fed by a battery 74 and the capacity of this battery is chosen to be so high that it continues functioning during the whole lifetime of the computer system. The capacity of the battery 60 is higher, though, but the current to be delivered is even higher.

The heart memory is a circuit block HD 146 818 P made by Hitachi and comprises an internal clock and an amount of read/write memory (RAM), which is, in effect, not volatile, by the provision of battery 74. It comprises in a capacity of 64 bytes information which always has to be available. Fourteen bytes are provided for the calender clock data and the remaining 50 bytes can be used for any purpose, of which an embodiment has been discussed above.

This memory comprises the absolute time updated by the internal clock as well as also the actual day, month and year. Furthermore this memory comprises in said 50 bytes: one alarm instant indicating the beginning of the active state, one end instant at which the active state may change-over to the standby state when the conditions concerned are satisfied, one indicator indicating the days on which there are no working hours in every week so that no active state need be initiated, the start and the end of the holiday period and some further indicators for indicating available program modules. Thus at any instant of any day it can be assessed whether the active state should prevail. Further information may relate to the configuration of the apparatus as represented by the presence of given control-units and associated peripheral apparatus, and for an indication relating to the initial program load operation, an operational hour counter and a system identification. Finally key information may be stored for secrecy coding (encryption) or for other purposes. Some of this information may be changed by a modification program, for example, for the beginning and the end of holiday periods, which may be different for each year. The IPL information gives the address of the memory or another device from where the program has to be loaded. If the certainty has to be very high, the IPL information has to take place upon all failures, even if the battery feed still comes out to be sufficient. On the other hand IPL operation is not carried out when the information can be used for faulty localization.

Figure 5:
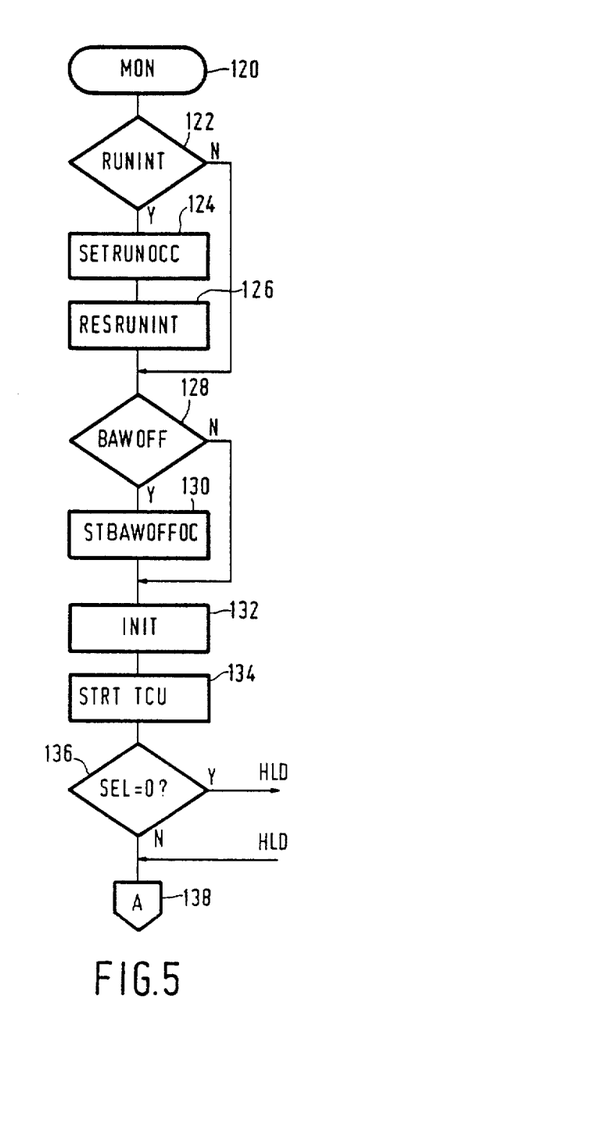
FIG. 5 shows a first part of a flow diagram of reactions to the "reappearance" of the mains voltage.

FIG. 5 shows a flow diagram of a first part of the reaction to the (re)appearance of the main voltage (MON) in block 120. In block 122 in the logic of the control-panel it is detected whether the activation indicator RUN is in the state "active". When this is true (Y) it is copied on a secondary activation indicator in the heart memory (block 124) and the activation in the control-panel indicator is reset (block 126). The signal to be given by the switch RUN is associated with the actuation of the switch and therefore, transient only. However, the indicator may in principle remain set for an indefinite time. In block 128 it is detected whether the battery indicator in the power supply (FIG. 4) is in the "error" position (block 130). If this is so it is copied on a secondary battery indicator in the heart memory (block 130). Then in block 132 part of the volatile memory of a value of 1 kbytes is initialized by loading from the background memory. Then in the volatile memory a foreground part or cache is initialized. In block 134 a test element is initialized so that given tests can be carried out. In itself such tests are conventional for logical circuits and the like. In some cases the blocks 132, 134 need not be implemented. In block 136 it is detected whether switch 104 of FIG. 7 is at "0". If so the HOLD state is obtained. This is only left later in the combination of the following cases: in the first place switch 104 is set to a different position. In the second place switch 106 temporarily gives off the signal (R)RUN. Only then block 138 is obtained from the HOLD position and the system goes over from block 138 to FIG. 6.

Figure 6:
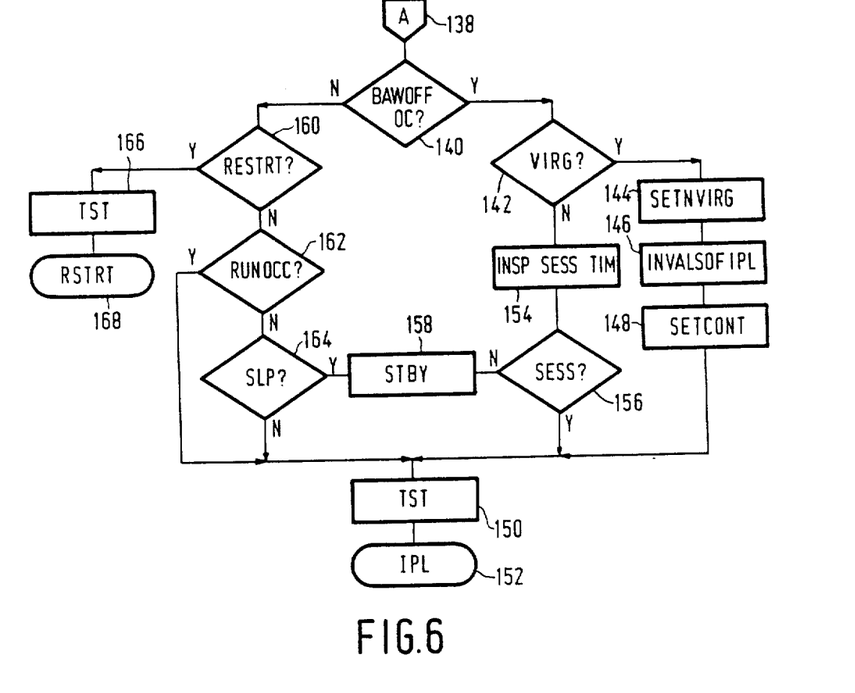
FIG. 6 shows a second part thereof.

FIG. 6 shows the sequel to the flow diagram of FIG. 5. In block 140 it is detected whether the indicator BAWOFF indicates that at any instant the battery voltage has been insufficient: this is in fact the copied version of BAWOFF in the heart memory. If this is so, it is detected in block 142 whether a given code VIRG in the heart memory (NVR=non-volatile memory) indicates that the machine is not initiated (the initiation occurs during the installation). When this is so two relevant bytes are set in the heart memory at HEX 5AA5 (block 144). Thereafter in block 146 the heart memory is further initialized in that the possibility of an initial program load operation under program control is made impossible for the future. In block 148 the session indicator of the heart memory is set to "continuous". All days of the week processing may be executed during the normal operational hours. In block 150 a self test is carried out. Then in block 152 the IPL operation is carried out. The other output of the block 142 leads to block 154: the actual instant and the standard hours for the active state are compared. When the standard hours indicate "active" (block 156) (output Y) the system goes again to block 150. When block 156 gives "N" as an output, the system goes in block 158 to the standby position.

When in block 140 it shows that the battery supply has not failed, the system goes over to block 160. In block 160 a test is made about the value of a RESTART indicator, which is a predetermined memory bit. This indicates whether a restart operation is needed or not needed and if it is effective. By this restart indication the influence of the activating request (RUN) can be ignored. This restart indication is located in the volatile memory and the handling (read-write) is carried out under program control. When this RESTART indicator is standing at invalid, in block 162 the RUN indicator which is stored in the heart memory is tested. When it indicates a receipt of a request for activation, the system goes over to block 150 which has been discussed. When such a request has not been received, the system goes over to block 164. In block 164 a test is made with respect to the SLEEP indication in the heart memory. This is again handled by the program. When this indicator is not true, the system goes again to block 150/152 in order to carry out an IPL operation. However, when said indication is true, the system goes over to block 158, which starts the standby position. When finally the RESTART indicator appears to be true in block 160, the system goes over to block 166, in which a self test as in block 150 is carried out, after which the system goes over to block 168. Then the restart operation proper is carried out. An extension of this RESTART operation is as follows: First the necessary operations are carried out; then a test is made on the actual time. If this indicates as compared with the scheduled hours for the active state that the standby state is prescribed, a waiting interval follows. When during this waiting interval, for example, 15 minutes, no information (data or request) is received from a work station, a transition to the standby state occurs. In other situations (active state is prescribed or information is received) the active state prevails.

FIG. 7 is a schematic view of the operator panel (54). This is not a panel on which program/data information is fed; the latter is done through the local or remote work stations. The panel comprises a LED element 100, a 7-segment display element (for one character) and three switches 104, 106 and 108. The display elements provide the possibility of showing given elementary information to the operator, for example, diagnostic results of the self test. A detected error can be displayed as a succession of two digits represented briefly one after the other in succession.

The switch 104 has ten positions relating to selection functions in the initial program load operation as described above. The switch 108 has a position off (FF) and a position "on" (ON). When the "off" position is activated, the mains and battery supply are interrupted and the system goes over to the rest state. When the switch is set in the "on" position all supplies are energized. The middle switch 106 can only be actuated when a mechanical key is used. Such mechanical keys are generally known per se. This switch has three positions: in the left hand position, the modifying of the other two switches is mechanically blocked. In the middle position of the switch 106 this blocking is relieved. The right-hand position is mechanically unstable. When the switch is released, the middle position is regained automatically for example by spring action. The right-hand position serves for activating the active position by means of the activation command RUN. The action thereof is discussed in the foregoing.

What is claimed is:

1. A computer system comprising:
   a central machine for processing data, said machine being adapted to be connected to a mains supply, said central machine including a volatile memory;
   a plurality of user work stations coupled to said central machine for remote users to exchange data with said central machine;
   reserve battery supply means connected to said central machine for temporarily supplying power to said volatile memory in the event said mains supply is interrupted;
   said central machine having four separate states: an active state, in which data exchange by said central machine with any of said work stations, including processing at said central machine can be carried out; a standby state, in which data exchange cannot be carried out between any of said workstations and said central machine but in which the volatile memory is powered by the mains supply for retaining information; a battery supply state in which the volatile memory is temporarily powered by the reserve battery supply means for retaining information; and a rest state, during which the central machine and volatile memory are deactivated and information stored in the volatile memory is lost;
   independently powered heart memory means operative during all said states for storing predetermined beginning and ending times for the active state and including real time clock means and means for setting said central machine in said active state during an active time period beginning at said beginning time and ending at said ending time;
   each said workstation including user control means for generating an activate state request signal requesting to change the state of said central machine from said standby state to said active state;
   means for generating a battery-was-off signal in the event power from said reserve battery supply means was interrupted during said battery supply state;
   means, including said heart memory means, for storing indications of the condition of said computer system including said battery-was-off signal and an indication of whether an activate state request signal has occurred; and
   logic means responsive to the presence of power from said mains supply for selectively placing said central machine in said active state or said standby state based on inspection of said stored condition indications including means for initiating an initial program load if said mains supply power reappears during said active time period and said battery-was-off signal is present.

2. The computer system of claim 1 wherein the activate state request signal produced by each said user control means is momentary and wherein said indications storing means includes means responsive to said momentary activate state request signal for storing a RUN signal indicating that a momentary activate state request signal has occurred; and wherein said logic means responsive to the presence of power from said mains supply also comprises means for initiating said initial program load in the presence of said RUN signal dependent on the state of said battery-was-off signal.

3. The computer system of claim 1 wherein said indication storing means includes means for storing a RESTART VALID signal in said heart memory means if an operation interrupted by failure of said main supply can be continued.

4. The computer system of claim 3 wherein said logic means further comprises means responsive to said RESTART VALID signal to put the central machine in the active state and initiate a RESTART operation upon the reappearance of power from said mains supply.

5. The computer system of claim 2 further comprising means for terminating the active state if said active time period has ended and no new activate state request signal is detected during a predetermined period.

6. The computer system of any of claims 1, 2 or 4 wherein said indications storing means further comprises means for storing a SLEEP signal in said heart memory and wherein said logic means also comprises means responsive to the presence of said SLEEP signal for putting said central machine in the standby state on the reappearance of power from said mains supply and in the absence of the battery-was-off signal.

7. The computer system of any of claims 1-5 further comprising operator selectable means for initializing data stored in said heart memory means except for said beginning and ending times.

8. The computer system of any of claims 1-5 wherein said heart memory means stores different beginning and ending times for a plurality of different days.

9. The computer system of claim 1 further comprising a control panel for a system operator including a first activating element having "on" and "off" positions for selectively placing said central machine in the rest state and a second activating element for generating an activate state request signal, said second activating element also comprising means for selectively locking said first activating element in position.

10. The computer system of claim 1 further comprising a control panel which includes selector means having at least two positions for selecting one of at least two sources in said computer system from which said initial program is to be loaded.

11. The computer system of claim 10 wherein said selector means has a further position for selecting said volatile memory as a source the initial program load.

* * * * *